United States Patent [19]
Hanes

[11] Patent Number: 6,141,971
[45] Date of Patent: Nov. 7, 2000

[54] CRYOCOOLER MOTOR WITH SPLIT RETURN IRON

[75] Inventor: Mark W. Hanes, Goleta, Calif.

[73] Assignee: Superconductor Technologies, Inc., Santa Barbara, Calif.

[21] Appl. No.: 09/175,924

[22] Filed: Oct. 20, 1998

[51] Int. Cl.[7] .............................. F25B 9/00; F01B 29/10; H02K 33/00
[52] U.S. Cl. ...................................... 62/6; 60/520; 310/15
[58] Field of Search ....................... 62/6; 60/520; 310/15

[56] References Cited

U.S. PATENT DOCUMENTS

| | | | |
|---|---|---|---|
| 3,736,761 | 6/1973 | Richmond et al. | 62/6 |
| 3,774,405 | 11/1973 | Leo | 62/6 |
| 4,389,849 | 6/1983 | Gasser et al. | 62/6 |
| 4,458,489 | 7/1984 | Walsh | 60/520 |
| 4,545,209 | 10/1985 | YOung | 62/6 |
| 4,610,143 | 9/1986 | Stolfi et al. | 62/6 |
| 4,924,675 | 5/1990 | Higham et al. | 62/6 |
| 5,040,372 | 8/1991 | Higham | 62/6 |
| 5,088,288 | 2/1992 | Katagishi et al. | 62/6 |
| 5,412,951 | 5/1995 | Wu | 62/6 |
| 5,642,623 | 7/1997 | Hiresaki et al. | 62/6 |

OTHER PUBLICATIONS

M.J. Scharen, et al., Filter Subsystems For Wireless Communications, IEEE Transactions On Applied Superconductivity, Jun. 1997; pp. 3744–3749.

*Primary Examiner*—William Doerrler
*Attorney, Agent, or Firm*—Lyon & Lyon LLP

[57] ABSTRACT

A cryocooler having an improved linear motor assembly. The cryocooler comprises a displacer unit, heat exchanger unit and compressor and linear motor assembly. The compressor and linear motor assembly includes a linear motor having both a stationary internal return iron element and a moving internal return iron element, thus enabling the motor to operate at a predetermined resonant frequency. In a preferred form, the compressor and linear motor assembly comprise a unitary structure.

9 Claims, 2 Drawing Sheets

CRYOCOOLER MOTOR WITH SPLIT RETURN IRON

FIELD OF THE INVENTION

The present invention relates generally to cryocoolers and, more particularly, to innovative cryocooler motors having both moving and stationary internal return iron elements or, stated somewhat differently, a "split" return iron element.

BACKGROUND

Recently, substantial attention has been directed to the field of superconductors and to systems and methods for using such products. Substantial attention also has been directed to systems and methods for providing a cold environment (e.g., 77° K or lower) within which superconductor products such as superconducting filter systems may function.

One device that has been widely used to produce a cold environment within which superconductor devices may function is the stirling cycle refrigeration unit or stirling cycle cryocooler. Such units typically comprise a displacer assembly and a compressor assembly, wherein the two assemblies are in fluid communication and are driven by one or more linear or rotary motors. Conventional displacer assemblies generally have a "cold" end and a "hot" end, the hot end being in fluid communication with the compressor assembly. Displacer assemblies generally include a displacer having a regenerator mounted therein for displacing a fluid, such as helium, from one end, i.e., the cold end, of the displacer assembly, to the other end, i.e., the hot end, of the displacer assembly. The piston assembly functions to apply additional pressure to the fluid, when the fluid is located substantially within the hot end of the displacer assembly, and to relieve pressure from the fluid, when the fluid is located substantially within the cold end of the displacer assembly. In this fashion, the cold end of the displacer assembly may be maintained, for example, at 77° K, while the hot end of the displacer assembly is maintained, for example, at 15° K above ambient temperature.

Now, in situations where it may be desirable to drive the drive the compressor and displacer assemblies using a single linear motor, and where it is desired to have the compressor assembly operate at a fairly high oscillation frequency, such as 60 Hz, several issues arise with regard to the design of the motor assembly. For example, it has been found that, when a conventional linear motor is used to drive the compressor and displacer assemblies of a cryocooler, it is extremely difficult to achieve a 60 Hz operating frequency for the compressor and displacer assemblies. One reason for this is that the diameter of the piston of a given compressor and the amount of displacement achieved by the displacer in a given displacer assembly dictate, to a very large degree, what the maximum amount of moving mass within an associated motor may be. If the moving mass is too great, the motor and associated compressor and displacer assemblies will not function properly.

Thus, it is believed that those skilled in the art would find a linear motor capable of operating at, for example, a 60 Hz resonant operating frequency, when coupled to a piston assembly used in a typical cryocooler to be quite useful.

SUMMARY OF THE INVENTION

The present invention is directed to a cryocooler motor having a split return iron element, i.e., a moving internal return iron element and a fixed or stationary internal return iron element. In one innovative aspect, a cryocooler motor in accordance with the present invention is operable at, for example, a 60 Hz resonant operating frequency when used to drive a compressor piston of a cryocooler assembly. Such a motor may comprise an external return iron element, a plurality of coils, a moving internal return iron element, a plurality of magnets affixed to the moving internal return iron element, and a stationary internal return iron element. Moreover, by splitting the internal return iron mass into a stationary element and a moving element it is possible to substantially reduce the amount of moving mass within the motor, and to allow the motor to operate at increased oscillation frequencies. In addition, by reducing the amount of moving iron mass within the motor, it is possible to significantly reduce the wear rate of the parts within the motor.

In another innovative aspect, a cryocooler system in accordance with a preferred form of the present invention has a compact, unitary motor and compressor assembly, thus reducing the size of the overall cryocooler system and enhancing the utility of such a cryocooler system in, for example, tower mount applications. Moreover, in a preferred form, a cryocooler system in accordance with the present invention may comprise a unitary compressor and linear motor assembly, a heat exchanger unit, and a displacer assembly.

The unitary compressor and linear motor assembly preferably comprises a compressor housing that provides structural support for both a compressor assembly and the elements of a linear motor. With regard to the provision of a linear motor, the compressor housing preferably has affixed thereto at least one external return iron element and a plurality of coils, the plurality of coils being fixed between an outer wall of the compressor housing and an inner surface of the external return iron element. The compressor housing also preferably has fixed therein at least one stationary internal return iron element such that a predetermined gap is provided between an exterior surface of the stationary internal return iron element and an inner wall of the housing. The compressor assembly preferably comprises a cylinder and a piston assembly, wherein the piston assembly is slideably disposed within the cylinder and is capable of linear translation along a central axis of the cylinder. The piston assembly preferably has affixed thereto at least one moving internal iron element, which has a length extending into the gap formed between the exterior surface of the stationary internal return iron element and the inner wall of the compressor housing. A plurality of magnets is affixed to the moving internal iron element. The displacer unit preferably includes a displacer that is coupled to a displacer rod. The displacer rod is slideably mounted within a central cavity of the piston assembly such that the displacer rod and piston assembly are capable of independent linear translation along the central axis of the compressor housing. In one particularly preferred embodiment, the displacer rod and piston assembly oscillate at a resonant frequency of approximately 60 Hz, and the motion of the displacer rod leads the motion of the piston assembly by approximately 90°.

In still another innovative aspect, a unitary linear motor and compressor assembly in accordance with the present invention may include a plurality of gas bearings that reduce and ideally eliminate friction between a piston and cylinder comprising the compressor portion of the unitary assembly. Pressurized gas may be passed, for example, through a check valve into a sealed interior of the piston, thus providing a source of pressurized gas for the gas bearing that does not fluctuate significantly with the pressure of any gas that resides in the compression chamber of the compressor assembly.

Accordingly, it is an object of the present invention to provide an improved cryocooler and an improved compressor and motor assembly for use within a cryocooler.

It is also an object of the present invention to provide a cryocooler motor that is capable of operating, for example, at a resonant frequency of 60 Hz within a cryocooler system, and to provide a cryocooler motor that may have a reduced wear rate.

Other objects and features of the present invention will become apparent from consideration of the following description taken in conjunction with the accompanying drawings.

DESCRIPTION OF THE PREFERRED EMBODIMENTS

Figure 1:
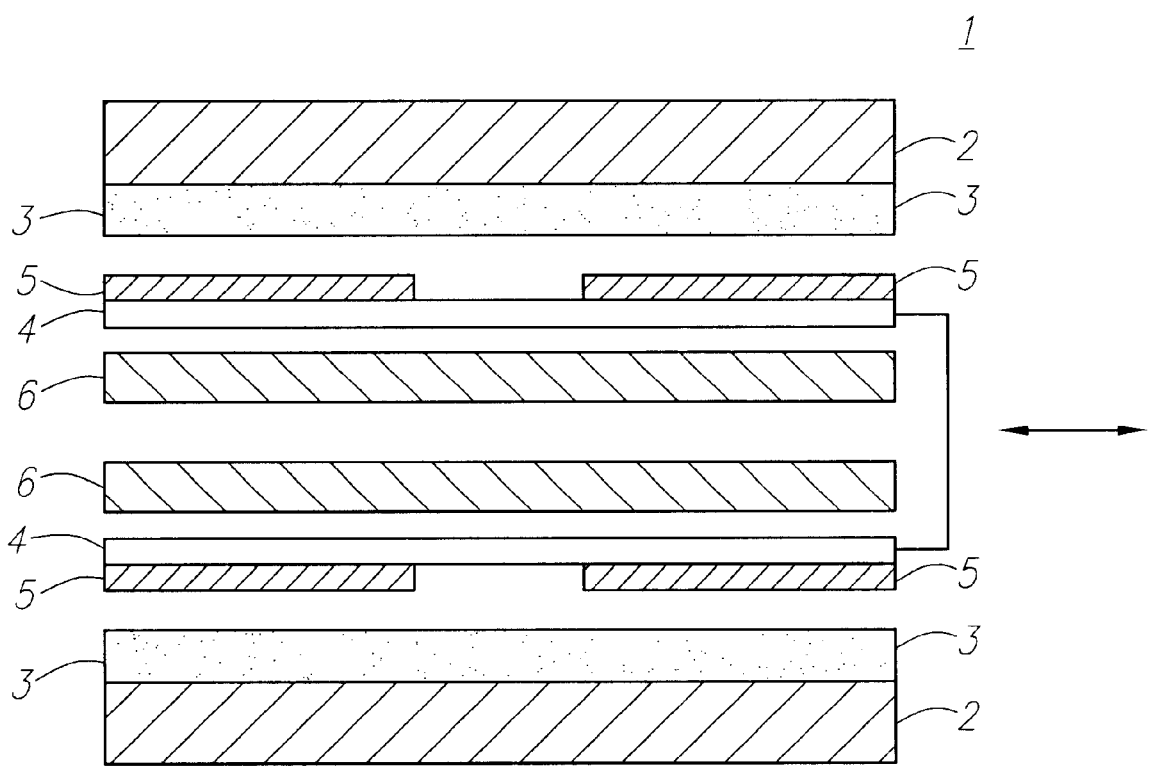
FIG. 1 is a block diagram illustrating the components of a linear motor assembly having a spit return iron element in accordance with a preferred form of the present invention.

Turning now to the drawings, as shown in FIG. 1, a linear motor assembly 1 in accordance with a preferred form of the present invention may comprise, for example, a plurality of external iron elements 2, a plurality of coils 3, a plurality of moving internal iron elements 4, a plurality of magnets 5 and a plurality of stationary internal elements 6. In a preferred form, the coils 3 are located in a position between the external iron elements 2 and the moving internal iron elements 4. In addition, the magnets 5 are preferably affixed to the moving internal iron elements 4. It will be appreciated that, by "splitting" the internal iron of the linear motor assembly 1 into a moving iron component 4 and a stationary iron element 6, it is possible to greatly reduce the moving mass within the linear motor assembly 1. Thus, through the use of a linear motor assembly in accordance with the present invention, it is possible to significantly reduce wear and tear that may result to the linear motor assembly 1 during operation. It also is possible, using a linear motor assembly 1 in accordance with the present invention, to construct a stirling cycle cryocooler 10 (as shown in FIG. 2) that is capable of operation at, for example, a resonant frequency of approximately 60 Hz with minimal wear and tear.

Figure 2:
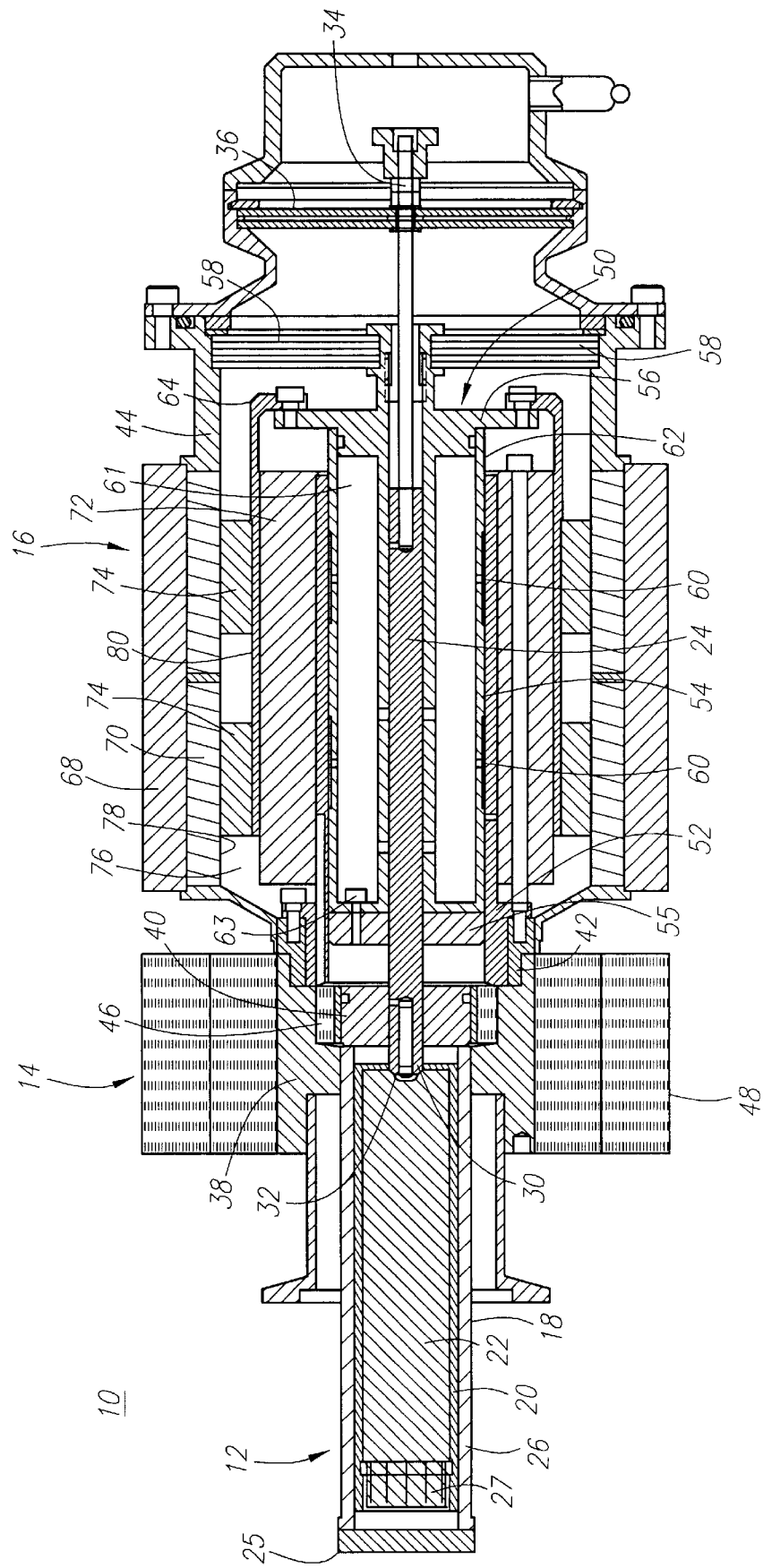
FIG. 2 is a cross-sectional illustration of a stirling cycle cryocooler in accordance with a preferred form of the present invention.

As shown in FIG. 2, a stirling cycle cryocooler 10 in accordance with a preferred form of the present invention may comprise a displacer unit 12, a heat exchanger unit 14, and a compressor and linear motor assembly 16.

The displacer unit 12 functions in a conventional manner and preferably includes a displacer housing 18, a displacer cylinder assembly 20 having a regenerator unit 22 mounted therein, and a displacer rod assembly 24. Preferably, at least a "cold end" 25 of the displacer unit 12 is made from high purity copper or oxygen free high conductivity (OFHC) copper. The displacer cylinder assembly 20 is slideably mounted within the displacer housing 18 and preferably rests against a displacer liner 26 that is affixed to an inner wall 28 of the displacer housing 18. A displacer end cap 27 is provided within a distal end of the displacer cylinder assembly 20. The displacer rod assembly 24 is coupled at one end 30 to a base section 32 of the displacer cylinder assembly 20 and coupled at the other end 34 to a displacer flexure spring assembly 36. Thus, under appropriate conditions, it is possible for the displacer cylinder assembly 20 to oscillate within the displacer housing 18.

The heat exchanger unit 14, which is located between the displacer unit 12 and the compressor and linear motor assembly 16, preferably includes a heat exchanger block 38, a flow diverter 40 or equivalent structure, and a heat exchanger mounting flange 42. The heat exchanger mounting flange 42 preferably is coupled to a distal end of a pressure housing 44 of the compressor and linear motor assembly 16. The heat exchanger block 38 preferably includes a plurality of internal heat exchanger fins 46 and a plurality of external heat rejector fins 48. Thus, the heat exchanger unit 14 is designed to facilitate heat dissipation from a gas, such as helium, that is compressed in the region $P_{HOT}$ located at the juncture between the displacer unit 12 and the compressor and linear motor assembly 16 (the region $P_{HOT}$ also is referred to herein as the compression chamber of the compressor and linear motor assembly 16). Preferably, the heat exchanger block 38, internal heat exchanger fins 46 and external heat rejector fins 48 are made from high purity copper.

The compressor and linear motor assembly 16 preferably includes a pressure housing 44 that has a piston assembly 50 mounted therein. The piston assembly 50 includes a cylinder 52, a piston 54 having a piston end cap 55 provided at a distal end thereof, a piston assembly mounting bracket 56 and a spring assembly 58. The piston assembly mounting bracket 56 provides a coupling between the piston 54 and the spring assembly 58, and the piston 54 is adapted for reciprocating motion within the cylinder 52. A plurality of gas bearings 60 is provided within the exterior wall 62 of the piston 54, and the gas bearings 60 receive gas, e.g., helium, from a sealed cavity 61 that is provided within the piston 54. A check valve 63 provides a unidirectional fluid communication conduit between the sealed cavity 61 and the region $P_{HOT}$ of the cylinder 52 (i.e., the compression chamber of the cylinder 52) when the pressure of the gas within that region exceeds the pressure within the cavity 61 (i.e., exceeds the piston reservoir pressure).

The piston assembly mounting bracket 56 preferably has mounted thereon a plurality of moving internal iron elements 64 that comprise a portion of a linear motor assembly 16.

The linear motor assembly 16 preferably comprises a plurality of external return iron elements 68, a plurality of coils 70, a plurality of stationary internal iron elements 72, the moving return iron elements 64 referenced above, and a plurality of magnets 74. The external iron elements 68 preferably are affixed to an exterior surface of the pressure housing 44, and the coils 70 preferably are located directly beneath the external return iron elements 68 and are mounted within recesses formed within the exterior surface of the pressure housing 44. The magnets 74 are affixed to an external surface of the moving return iron elements 68. Thus, it will be appreciated that, as the piston 54 moves within the cylinder 52, the moving internal iron elements 64 and magnets 74 also move within a gap 76 that is formed between an inner wall 78 of the pressure housing 44 and an external surface 80 of the stationary return iron elements 72. The iron elements 68 and 72 preferably are manufactured from pre-insulated iron powders available, for example, from Hoeganaes Corp. of Riverton, N.J., under the brand name Ancorsteel™ SC 120, and the moving internal iron element 69 preferably is manufactured from 420 Stainless Steel.

By configuring the compressor and linear motor assembly 16 in the manner described above, i.e., in accordance with the present invention, it is possible to greatly reduce the mass of the piston assembly 50, thus significantly reducing the overall spring constant required to cause the piston assembly 50 to resonate at a predetermined frequency. It also is possible to greatly reduce the wear rate of the compressor and linear motor assembly 16, and possible to significantly reduce unwanted vibrations that may occur during operation of the cryocooler 10.

Now, during operation, the piston 54 and displacer cylinder assembly 20 preferably oscillate at a resonant frequency of approximately 60 Hz and in such a manner that the oscillation of the displacer cylinder assembly 20 is approximately 90° out of phase with the oscillation of the piston 54. Stated somewhat differently, it is preferred that the motion of the displacer cylinder assembly 20 will "lead" the motion of the piston 54 by approximately 90°.

Those skilled in the art will appreciate that, when the displacer cylinder assembly 20 moves to the "cold" end $P_{COLD}$ of the displacer housing 18, most of the fluid, e.g. helium, within the system is displaced to the warm end $P_{HOT}$ of the displacer housing 18 and/or moves around the flow diverter 40 and through the internal heat exchanger fins 46 into the compression area $P_{HOT}$ of piston assembly 50. Due to the phase difference between the motion of the displacer cylinder assembly 20 and the piston 54, the piston 54 should be at mid-stroke and moving in a direction toward the flow diverter 40 when displacer cylinder assembly 20 is located at the cold end of the displacer housing 18. This causes the helium in the areas $P_{HOT}$ and $P_{HOT}$ to be compressed, thus raising the temperature of the helium. The heat of compression is transferred from the compressed helium to the internal heat exchanger fins 46 and from there to the heat exchanger block 38 and external heat rejector fins 48. From the heat rejector fins 48, the heat is transferred to ambient air. As the displacer assembly 20 moves to the warm end $P_{HOT}$ of the displacer housing 18, the helium is displaced to the cold end $P_{COLD}$ of the displacer housing 18. As the helium passes through the displacer cylinder 20, it deposits heat within the regenerator 22, and exits into the cold end $P_{COLD}$ of the displacer housing 18 at approximately 77° K. At this time, the compressor piston 54 preferably is at mid-stroke and moving in the direction of the piston flexure springs 58. This causes the helium in the cold end $P_{COLD}$ of the displacer housing 18 to expand further reducing the temperature of the helium and allowing the helium to absorb heat. In this fashion, the cold end $P_{COLD}$ functions as a refrigeration unit and may act as a "cold" source.

Turing now to the operation of the displacer unit 12, the motion of the displacer cylinder assembly 20 preferably leads the motion of the piston 54 by 90°. This relationship is achieved by utilizing the pressure difference between the compression chamber $P_{HOT}$ and the "bounce volume," $P_B$, which acts on the cross-sectional area of the displacer rod assembly 24. The complete force balance on the displacer rod assembly 24 may be described by the following equation:

$$(P_{HOT}-P_{COLD})*A_{DISP}+(P_B-P_{HOT})*A_{DROD}+k*x+F_{FR}=m*a, \text{ where}$$

$P_{HOT}$=pressure in the hot end of the displacer housing;
$P_{COLD}$=pressure in the cold end of the displacer housing;
$A_{DISP}$=cross-sectional area of the displacer cylinder assembly 20;
$P_B$=pressure in the bounce volume;
$A_{DROD}$=cross-sectional area of the displacer rod;
k=overall displacer spring constant
x=displacement of the displacer cylinder assembly 20;
$F_{FR}$=force of friction;
m=mass of the displacer cylinder assembly 20; and
a=acceleration of the displacer cylinder assembly 20.

As explained above, when all of the above-described variables are designed correctly, the motion of the displacer cylinder assembly 20 will lead the motion of the piston 54 by approximately 90°. Exemplary ranges for the above-described variables are as follows: $P_{HOT}$ (+/−10 psi to +/−40 psi); $P_{COLD}$ (+/−10 psi to +/−40 psi); $P_B$ (+/−3 to +/−5 psi); $A_{DISP}$ (0.50 to 0.64 sq. in.); $A_{DROD}$ (0.02 to 0.05 sq. in.); k (50 to 75 lbs/in); x (+/−0.05 to +/−0.15 in.); m (35 to 50 g.); a (40 G peak acceleration); and $F_{FR}$ (ideally assumed to be 0). The charge pressure within the pressure housing 44 preferably is maintained between 175 and 350 psi.

Those skilled in the art will appreciate, of course, that for each cryocooler configuration the above-defined variables may, and likely will, vary. For example, different variables would be utilized for cryocoolers designed to provide 8 and 12 watts of cooling capacity respectively.

While the invention is susceptible to various modifications and alternative forms, a specific example thereof has been shown in the drawing and is herein described in detail. It should be understood, however, that the invention is not to be limited to the particular form or method disclosed, but to the contrary, the invention is to cover all modifications, equivalents, and alternatives falling within the spirit and scope of the appended claims.

What is claimed is:

1. A unitary, compressor and linear electric motor assembly for use in a cryocooler, said assembly comprising:
    a compressor housing providing structural support for a displacer rod assembly, a cylinder assembly and components of a linear motor,
    said compressor housing having fixed thereto at least one external return iron element and a plurality of coils, said plurality of coils being fixed between an outer wall of said compressor housing and an inner surface of said at least one external return iron element, and said compressor housing having fixed therein at least one stationary internal return iron element such that a predetermined gap is provided between an exterior surface of said at least one stationary internal return iron element and an inner wall of said compressor housing,
    said cylinder assembly comprising a cylinder housing fixed within said compressor housing and a piston assembly, said piston assembly being slideably disposed within said cylinder housing and being capable of linear translation along a central axis of said cylinder housing, and said piston assembly having affixed thereto at least one moving internal magnetic iron element, said at least one moving internal magnetic iron element having a length extending into said gap between said exterior surface of said at least one stationary internal return iron element and said inner wall of said compressor housing and having a plurality of magnets affixed to an external surface thereof, and
    said displacer rod assembly including a displacer rod slideably mounted within a central cavity of said piston assembly such that said displacer rod and said piston assembly are capable of independent linear translation along said central axis of said cylinder housing.

2. The assembly of claim 1 further comprising at least one gas bearing provided between an inner wall of said cylinder housing and an external wall of said piston assembly.

3. A stirling cycle cryocooler comprising:

a displacer unit, a heat exchanger unit, and a compressor and linear motor assembly wherein a linear motor of said compressor and linear motor assembly comprises a stationary external iron element, a stationary internal return iron element, a plurality of coils, a moving internal magnetic return iron element and a plurality of magnets affixed to an external surface thereof, said stationary external iron element and said coils being affixed to a housing of said compressor and linear motor assembly, said stationary internal return iron element be fixed at a location within said housing, and said moving internal magnetic return iron element and magnets being configured for translational movement within said housing.

4. A stirling cycle cryocooler comprising:

a displacer unit, a heat exchanger unit, a compressor assembly and a linear motor assembly, said displacer unit and said compressor assembly being in fluid communication, a displacer within said displacer unit and a piston within said compressor assembly being configured for translational, oscillatory movement along a common axis, said heat exchanger unit being disposed between said displacer unit and said compressor assembly, and a moving element of said linear motor assembly being coupled to said piston, said linear motor assembly having both a stationary internal iron element and a moving internal magnetic iron element, and one or more magnets affixed to the moving internal magnetic iron element, the piston and the displacer unit being capable of operation at a predetermined frequency.

5. A combined compressor and linear motor assembly comprising:

a compressor assembly having a piston attached to a moving internal magnetic iron element of a linear motor, wherein said linear motor comprises an external iron element, a stationary internal iron element, said moving internal magnetic iron element, a plurality of magnets, and a plurality of coils, said moving internal magnetic iron element having said magnets affixed thereto, and said plurality of coils being fixedly disposed in an area generally between said external iron element and said magnets.

6. A cryocooler comprising:

a displacer unit, a heat exchanger unit and a combined compressor and linear motor assembly;

said combined compressor and linear motor assembly comprising a compressor and linear motor; said compressor being disposed within a pressure housing and having a cylinder and a piston; said cylinder being in fluid communication with said displacer unit, and said piston being adapted for translational movement within said cylinder along a central axis of said pressure housing and being coupled to a moving internal magnetic iron element of said linear motor; said linear motor having a stationary external iron element and coil assembly affixed to said pressure housing, a stationary internal iron element fixedly disposed adjacent an external surface of said cylinder within said pressure housing, said moving internal magnetic iron element having a plurality of magnets coupled thereto;

said displacer unit being coupled to said pressure housing and having a displacer housing, a displacer cylinder assembly including a regenerator unit, and a displacer rod assembly; said displacer cylinder assembly being capable of translational movement within said displacer housing and being coupled to said displacer rod assembly, said displacer rod assembly including a displacer rod that is coupled at a first end to said displacer cylinder assembly, extends through a bore formed within said piston along a central axis of said pressure housing, and is coupled at a second end to displacer flexure spring assembly mounted within a proximal end of said pressure housing; and said heat exchanger unit being disposed at a juncture between said displacer unit and said cylinder of said compressor, said heat exchanger unit having a flow diverter, a plurality of internal heat exchanger fins, a heat rejector block and a plurality of external heat rejector fins, said internal heat exchanger fins being coupled to said flow diverter and said heat rejector block, and said external heat rejector fins being coupled to said heat rejector block and being in communication with ambient air.

7. The cryocooler of claim 6, wherein said piston has a sealed internal cavity and has a plurality of gas bearings provided along an external surface thereof.

8. A stirling cycle cryocooler comprising:

a displacer unit, a heat exchanger unit, a compressor assembly and a linear motor assembly, said displacer unit and said compressor assembly being in fluid communication, a displacer within said displacer unit and a piston within said compressor assembly being configured for translational, oscillatory movement along a common axis, said heat exchanger unit being disposed between said displacer unit and said compressor assembly, and a moving element of said linear motor being coupled to said piston, said linear motor having both a stationary internal iron element and a moving internal iron element, and being capable of operation at a predetermined frequency, wherein said predetermined frequency is between 30 and 120 Hz.

9. A cryocooler comprising:

a displacer unit, a heat exchanger unit and a combined compressor and linear motor assembly;

said combined compressor and linear motor assembly comprising a compressor and linear motor; said compressor being disposed within a pressure housing and having a cylinder and a piston; said piston has a sealed internal cavity and has a plurality of gas bearings provided along an external surface thereof; said piston further including a check valve that provides a unidirectional fluid communication conduit between said cavity formed within said piston and a compression chamber of said cylinder when a pressure of a gas within said pressure chamber of said cylinder exceeds a pressure within said cavity; said cylinder being in fluid communication with said displacer unit, and said piston being adapted for translational movement within said cylinder along a central axis of said pressure housing and being coupled to a moving internal iron element of said linear motor; said linear motor having a stationary external iron element and coil assembly affixed to said pressure housing, a stationary internal iron element fixedly disposed adjacent an external surface of said cylinder within said pressure housing, said moving internal iron element and a plurality of magnets coupled to said internal iron element;

said displacer unit being coupled to said pressure housing and having a displacer housing, a displacer cylinder assembly including a regenerator unit, and a displacer rod assembly; said displacer cylinder assembly being capable of translational movement within said displacer housing and being coupled to said displacer rod assembly, said displacer rod assembly including a displacer rod that is coupled at a first end to said displacer cylinder assembly, extends through a bore formed within said piston along a central axis of said pressure housing, and is coupled at a second end to displacer flexure spring assembly mounted within a proximal end of said pressure housing; and said heat exchanger unit being disposed at a juncture between said displacer unit and said cylinder of said compressor, said heat exchanger unit having a flow diverter, a plurality of internal heat exchanger fins, a heat rejector block and a plurality of external heat rejector fins, said internal heat exchanger fins being coupled to said flow diverter and said heat rejector block, and said external heat rejector fins being coupled to said heat rejector block and being in communication with ambient air.

* * * * *

UNITED STATES PATENT AND TRADEMARK OFFICE
CERTIFICATE OF CORRECTION

PATENT NO. : 6,141,971  
DATED : November 7, 2000  
INVENTOR(S) : Hanes

Page 1 of 1

It is certified that error appears in the above-identified patent and that said Letters Patent is hereby corrected as shown below:

<u>Title page,</u>  
Under References Cited, U.S. PATENTS, please change "YOung" to -- Young --.

<u>Column 4,</u>  
Line 66, change "69" to -- 64 --.

Signed and Sealed this

Seventh Day of May, 2002

Attest:

Attesting Officer

JAMES E. ROGAN  
*Director of the United States Patent and Trademark Office*